(12) United States Patent
Bradley

(10) Patent No.: US 12,459,582 B2
(45) Date of Patent: Nov. 4, 2025

(54) LOCATING FEATURE FOR SUPPORT MEMBER FOR TRAILER SKIRT

(71) Applicant: Trailer Aerodynamics LLC, Chicago, IL (US)

(72) Inventor: Calvin Rhett Bradley, Blountville, TN (US)

(73) Assignee: Trailer Aerodynamics LLC, Chicago, IL (US)

( * ) Notice: Subject to any disclaimer, the term of this patent is extended or adjusted under 35 U.S.C. 154(b) by 379 days.

(21) Appl. No.: 18/245,489

(22) PCT Filed: Oct. 30, 2020

(86) PCT No.: PCT/US2020/058207
§ 371 (c)(1),
(2) Date: Mar. 15, 2023

(87) PCT Pub. No.: WO2022/093264
PCT Pub. Date: May 5, 2022

(65) Prior Publication Data
US 2023/0356789 A1    Nov. 9, 2023

(51) Int. Cl.
*B62D 35/00*     (2006.01)
(52) U.S. Cl.
CPC ................... *B62D 35/001* (2013.01)
(58) Field of Classification Search
CPC .................................................. B62D 35/001
See application file for complete search history.

(56) References Cited

U.S. PATENT DOCUMENTS

| 8,727,425 | B1 | 5/2014 | Senatro | |
| 9,957,991 | B2 * | 5/2018 | Mancina | B62D 35/02 |
| 10,343,731 | B2 * | 7/2019 | Emery | B62D 24/00 |
| 2017/0274942 | A1 * | 9/2017 | Boivin | B62D 35/001 |

FOREIGN PATENT DOCUMENTS

| CA | 2797778 A1 * | 7/2009 | ............ B60R 13/00 |
| CA | 2848174 A1 * | 10/2014 | ........... B62D 35/001 |
| WO | 2017059327 A1 | 4/2017 | |
| WO | WO-2017059330 A1 * | 4/2017 | ........... B62D 35/001 |

OTHER PUBLICATIONS

European Patent Office, International Search Report dated Jul. 8, 2021 and Written Opinion of the International Searching Authority, pp. 1-15 (included), European Patent Office, Rijswijk, The Netherlands.

\* cited by examiner

*Primary Examiner* — Lori Lyjak
(74) *Attorney, Agent, or Firm* — Hansen Reynolds LLC

(57) ABSTRACT

An apparatus is provided that has a trailer mounting bracket that carries a bending member, and a skirt attachment configured for being carried by a skirt of a tractor trailer. The bending member is received by the skirt attachment such that the bending member is configured to slide relative to the skirt. A locating feature that has a first member and a second member is present in which one of the first member and the second member is carried by the skirt attachment. The first member and the second member interact with one another to stabilize the position of the bending member relative to the skirt until a sufficient amount of force is applied to move the first member and the second member relative to one another to allow the bending member to slide relative to the skirt.

16 Claims, 16 Drawing Sheets

LOCATING FEATURE FOR SUPPORT MEMBER FOR TRAILER SKIRT

CROSS-REFERENCE TO RELATED APPLICATIONS

The present application is a 35 U.S.C. § 371 application of PCT/US2020/058207 filed on Oct. 30, 2020 and entitled "Locating Feature for Support Member for Trailer Skirt" and claims benefit thereto. The entire contents of PCT/US2020/058207 are incorporated by reference herein in their entirety for all purposes.

FIELD OF THE INVENTION

The subject matter of the present invention relates to a locating feature that can properly locate parts of a support member that supports a tractor trailer skirt. More particularly, the present application involves a locating feature that stabilizes relative movement between a bending member of the support member and skirt of the trailer.

BACKGROUND OF THE INVENTION

Trailers towed by trucks and similar vehicles for transporting cargo can be large, unwieldy, and include geometries which invite inefficiencies during travel. One aspect of these inefficiencies concerns the aerodynamics of the trailer. In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced. The reduction in drag permits the trailer to be towed more efficiently, increasing the gas mileage and performance of the vehicle and its cargo. Trailer skirts should be rigid enough to not deform in their normal operating condition to appropriately deflect air and prevent drag on the moving trailer, however the skirt needs to exhibit some degree of flexibility because it is close to the ground and can hit curbs, snow, road debris, or other objects thus necessitating movement of the skirt to prevent the skirt from being detached or damaged. Other aerodynamic devices that require support but are subject to impacts and require flexibility are tractor trailer cab extenders, and trailer mounted gap reducers which are both classified as skirts herein.

It is known to provide support members attached to the trailer that engage and support the skirt. These support members themselves can flex to accommodate flexing of the skirt when the skirt strikes an object. The support member includes a skirt attachment connected to the skirt, and a bending member that is flexible that slides against the skirt attachment when the skirt is hit and deflects laterally. The use of a flexible bending member is susceptible to vibrations when small amounts of force are imparted onto the skirt by wind or vehicle vibrations through normal driving operations. These small amounts of force reduce aerodynamic performance, can cause the skirt to flutter which detracts from aesthetics, and can cause relative motion between the bending member and the skirt attachment. This relative motion can cause wear to occur between the bending member and the skirt attachment which leads to a looser fit and may reduce the lifespan of one or both of these components.

As a secondary concern, during the assembly process the skirt attachment may be assembled onto the bending member before installation onto the skirt and trailer. The position of the skirt attachment along the bending member may impact the performance of the system. If installed too low on the bending member, the bending member may slide completely out of the skirt attachment when impacting forces are imparted onto the skirt. If assembled too high on the bending member, the skirt attachment may not provide the desired support to the vertically lower part of the skirt. Although support members with flexible components for supporting a trailer skirt are known, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
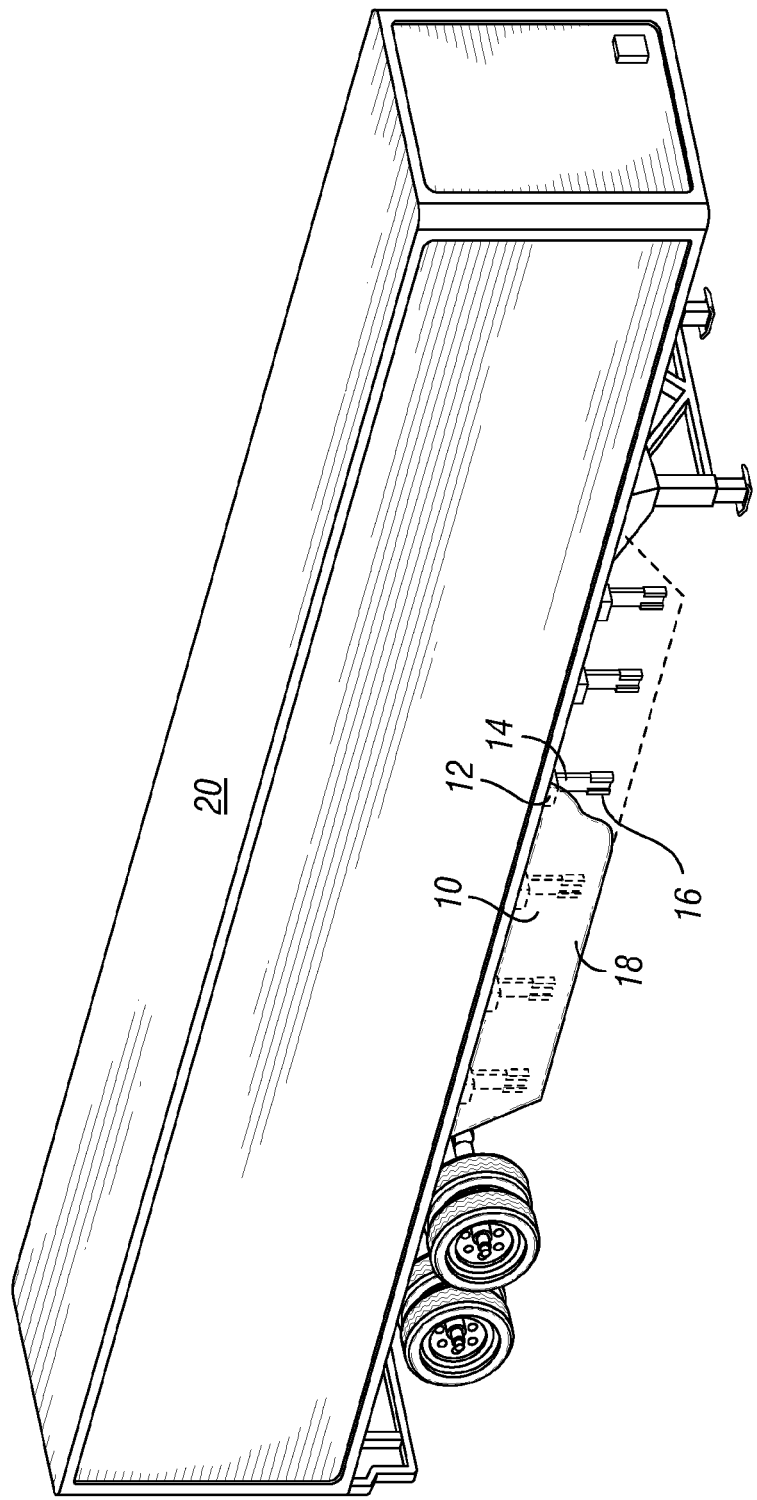
FIG. 1 is a perspective view of an aerodynamic trailer system attached to a trailer with a portion of the skirt shown in hidden line for clarity.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that has a bending member 14 and a skirt attachment 16 that support a skirt 18 of a tractor trailer when the skirt 18 bends through engagement with an object 88 such as a barrier or curb. The apparatus 10 has a locating feature 22 that minimizes or eliminates vibration and small movement of the bending member 14 relative to the skirt attachment 16 and/or skirt 18 which would otherwise occur through normal operation. If a sufficient amount of force is applied to the skirt 18, the skirt 18 will bend and cause the locating feature 22 to be disengaged to allow the bending member 14 to slide relative to the skirt 18 and/or skirt attachment 16. As an additional feature, the locating feature 22 may allow the skirt attachment 16 to be properly located relative to the bending member 14 to assist in the assembly process of the apparatus 10.

An apparatus 10 fitted onto a trailer 20 of the tractor trailer is illustrated with reference to FIG. 1 in which the skirt 18 is located under the trailer 20 and prevents air from hitting the rear wheels of the trailer 20 during travel of the trailer 20. The skirt 18 extends in a longitudinal direction of the trailer 20 and may be oriented at an angle to the trailer 20 or in some instances may extend in the same direction as the length of trailer 20. The skirt 18 can have any length in the longitudinal direction but generally extends from the rear wheels to the vertical support of the trailer 20. A second skirt (not shown) can be located on the opposite side of the trailer 20 to prevent or direct air flow related to the opposite side. Any number of bending members 14 may be used to support the skirt 18. Brackets can be attached to the top of the skirt 18 and the bottom surface or I-beams of the trailer 20 to in turn attach the skirt 18 to the trailer 20. The opposite skirt (not shown) may likewise have any number of support members integrated therewith for its support.

As used herein, the term "skirt" is broad enough to include any aerodynamic component of a tractor trailer that includes a panel (straight, curved, or variously shaped) that is mounted or otherwise attached to the trailer to improve its aerodynamic properties. The skirt 18 can be a panel or a series of panels located on the trailer 20 of the tractor trailer. The skirt 18 could also be a gap reducer that is attached to the trailer 20 along a vertical wall of the trailer 20 in the gap between the tractor and the trailer 20 that functions to improve aerodynamic performance at this location. The skirt 18 could also be a cab extender that is attached to the tractor at the location next to the trailer 20 to improve aerodynamic performance of the tractor trailer at this location. It is to be understood that the term "skirt" 18 and other components with the word "skirt" in them as used herein cover not just the panel along the bottom of the trailer 20, but any aerodynamic component carried by the tractor or trailer 20. The use of a skirt 18 and associated described components at the bottom of the trailer 20 herein is but one example and is used for sake of convenience. It is to be understood that the skirt 18 could be carried at the bottom of the trailer 20, but other embodiments exist in which the skirt 18 is carried by the tractor that pulls the trailer 20 or at different locations on the trailer 20.

The height of the skirt 18 may be selected so that it is large enough to cover the necessary area of air deflection that is desired, yet small enough so that it is not scraping the ground or otherwise easily hitting the road surface or objects 88 resting on the road surface. It is presumed, however, that in the normal course of driving the skirt 18 will strike objects 88 when the trailer 20 navigates curves, goes over objects, reaches a crown in the road, hits a snowbank, or otherwise engages anything found on roads or in distribution centers.

Figure 2:
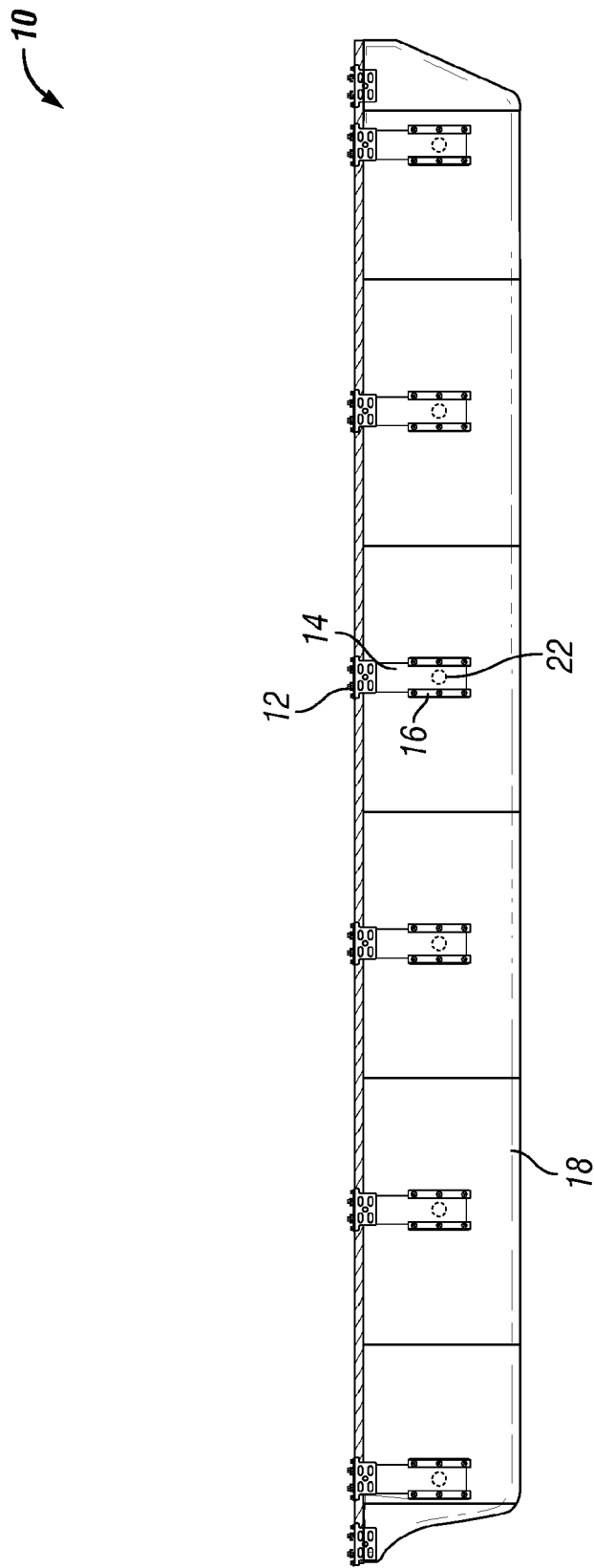
FIG. 2 is a back elevation view of the apparatus including the skirt, trailer mounting bracket, bending member, and skirt attachment.

A back view of the skirt 18 with the attached bending members 14 of the apparatus 10 is illustrated with reference to FIG. 2. A trailer mounting bracket 12 is attached to the trailer 20, for example through bolting, and the bending member 14 is attached to the trailer mounting bracket 12 and extends in the vertical direction. The bending members 14 and trailer mounting brackets 12 are located at the top of the skirt 18 in the vertical direction and are generally spaced evenly from one another in the longitudinal direction. The bending members 14 extend from the top of the skirt 18 downward in the vertical direction but do not extend the entire length of the height of the skirt 18. Instead, the bending members 14 stop short of the bottom of the skirt 18. The skirt 18 may be a single piece member made up of one component or can be multiple components that are attached to one another. In the embodiment in FIG. 2, the skirt 18 is made from a plurality of central panels that are attached to one another to form almost the entire length. A rear trailer skirt panel forms the back end of the skirt 18 and is attached to the tailing central panel. The rear trailer skirt panel has a shape and size different than the central panel to which it is attached. A front trailer skirt panel is located at the front of the skirt 18 and is attached to and shaped and sized differently than the leading central panel.

The bending members 14 may be configured in a variety of manners in accordance with different exemplary embodiments so that they perform the functions of supporting the skirt 18 and allow for bending of the skirt 18 to take place when the skirt 18 engages an object 88. The bending member 14 may comprise a rigid or flexible member, may be elongate, and can be attached to the skirt 18 using any desired mechanism, such as by use of one or more fasteners, weldments, adhesives, clamps, and/or mounting brackets as previously stated.

Figure 3:
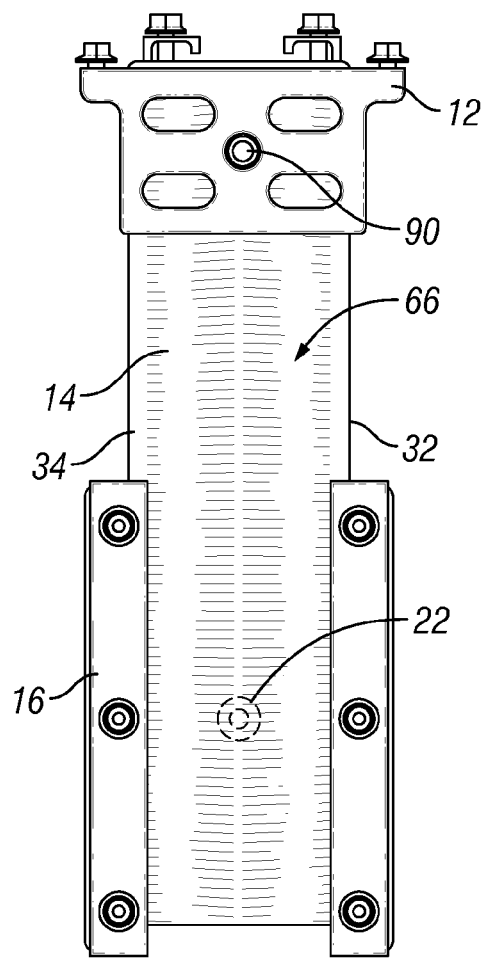
FIG. 3 is a front elevation view of the trailer mounting bracket, bending member, and skirt attachment.
Figure 4:
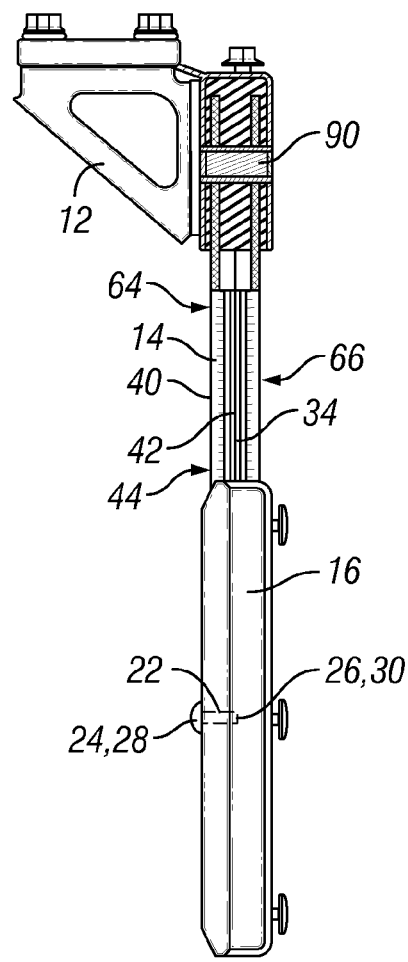
FIG. 4 is a side elevation view of FIG. 3.
Figure 5:
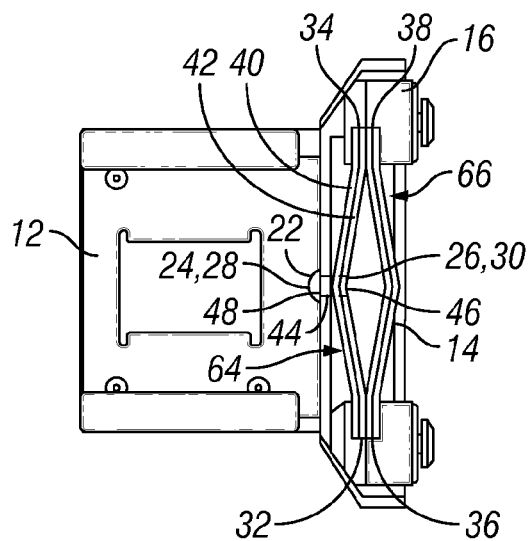
FIG. 5 is a bottom view of FIG. 3.

In certain embodiments, as discussed further below, the bending member 14 is a bi-modulus bending member, and the step of assembly comprises attaching a skirt attachment 16 to the skirt 18, and the bending member 14 to the trailer 20 in a cantilevered position. One such design is illustrated with reference to FIGS. 3-5. It is appreciated that in any cantilevered configuration, the bi-modulus bending member 14 may be fixedly attached at any point along its length, including at a terminal end thereof. It is also appreciated that the bending member 14 may be attached in any desired manner, such as by use of one or more fasteners, weldments, adhesives, clamps, and/or mounting brackets, for example. The bending member 14 is mounted to the trailer mounting bracket 12 with a connection that does not pivot but is generally static. In some arrangements, and as shown in FIGS. 3-5, the bending member 14 is retained within a pin

90 and resilient member attachment, which is made of an elastomeric material, that permits the bending member 14 to twist while remaining fixed in certain directions within the apparatus 10 by the pin 90 extending through the bending member 14 and into the trailer mounting bracket 12. The skirt attachment 16 is connected to the skirt 18 with a connection that does not pivot. As shown, six bolts are used to attach the skirt attachment 16 to the skirt 18. The bending member 14 engages the skirt attachment 16 and is held therein. In some embodiments, the bending member 14 is non-pivotally attached to the trailer mounting bracket 12 and does not move therewith. For example, the bending member 14 may be bolted to the trailer mounting bracket 12. In other arrangements, the bending member 14 may slide relative to the trailer mounting bracket 12. The bending member 14 may have any cross-sectional shape, and as illustrated is made of a plurality of bending elements 40, 42 that are V-shaped that nest within one another and that face corresponding bending elements. As shown, especially with reference to FIG. 5, there are four bending elements shown, two of them 40, 42 being nested with one another, and the other two being nested with one another. Any number of bending elements 40, 42 can be used and they may or may not be nested with one another in accordance with various exemplary embodiments.

The bending member 14 is designed to resist an applied force without noticeably bending or deforming, but when the applied force exceeds a designed threshold force, the bi-modulus elongate bending member 14 elastically bends into a bent arrangement, which may bifurcate the bi-modulus elongate bending member 14, and elastically returns to its original or unbent arrangement. When bending, the bi-modulus bending member 14 buckles (that is, the cross-section buckles), whereby the cross-section shape (profile) changes from a first cross-section shape to a second cross-section shape. The first cross-sectional shape is shown with reference to FIGS. 3-5, and the second cross-sectional shape is shown with reference to FIG. 6. By doing so, the bi-modulus elongate bending member 14 and each of the one or more bending elements 40, 42 forming the bending member 14 elastically buckle and bend to a buckled configuration when an applied force (such as its lateral force component) exceeds a threshold force and elastically return to an unbuckled or unbent configuration when the applied force is reduced below the threshold force or removed. Stated differently, the bi-modulus elongate bending member 14 can be characterized as being a bi-modulus (or bi-stable) member, where each member or element resists bending with a first bending modulus or stiffness until it buckles or collapses and thereafter bending ensues without any notable plastic deformation or resistance, where the buckled cross-section has a second bending modulus.

In particular embodiments, the bi-modulus characteristic is accomplished by the bending member 14 being a thin-walled member, having a sufficiently thin thickness, such as a thickness of 1.0 millimeters (mm) or less, or 0.5 mm or less, for example. In certain embodiments, the bending member 14 is made of a plurality of bending elements 40, 42 each made of a sheet of spring steel that is 0.5 mm or less thick, and in other variations, made from any other similarly thin product made of a material other than steel, whether inelastic or elastic, such as any metal, polymer, or other material. Additionally, or in the alternative, in certain embodiments, the bi-modulus characteristic for a bending member 14 is accomplished by the height of the cross-section being less than the width. By increasing the height, the bending stiffness increases, while decreasing the height, the bending stiffness decreases. It is also noted that when employing a plurality of stacked bending elements 40, 42, the stacked bending elements 40, 42 are able to slide relative to each other, which also facilitates the bi-modulus behavior. Moreover, the bi-modulus characteristic may be further accomplished by the unbent or unbuckled cross-section being asymmetrical, the cross-section being asymmetric relative to a centerline extending in a direction of the bending member's 14 width. The centerline forms a neutral bending axis or a line that divides the cross-sectional area into equal halves. It is appreciated that any cross-section of the bending member 14 may be constant or variable in size and/or shape along the length of the bending member 14. Although shown as V-shaped, the bending member 14 can be variously shaped in other embodiments and may be selected of material that is of a desired thickness. In some embodiments, the bending member 14 is a single flat, thin bar capable of bending when sufficient force is applied and springing back into its initial shape when the force is removed.

The orientation of the bending member 14 and the skirt attachment 16 is in its first cross-sectional shape in FIGS. 3-5 in which they can support the skirt 18. When an object 88 strikes the skirt 18 and supplies a sufficient amount of force thereto, it may deflect and the bending member 14 can likewise deflect so that it assumes a second cross-sectional shape as shown with reference to FIG. 6. Here, the skirt 18 is connected to the skirt attachment 16 via six bolts, although any number may be used in other embodiments. As the bending member 14 is bent from the first cross-sectional shape, a portion of it compresses at the turn radius and the rest above and below this turn radius may change shapes. The bending member 14 is in the second cross-sectional shape in FIG. 6 and maintains this shape while holding the skirt 18 and can spring back into the first cross-sectional shape when the force from the object 88 is removed, such as once the skirt 18 moves over the curb 88 and out of engagement therewith so that the buckling force is removed. During this deformation, the skirt attachment 16, and the skirt 18, slide relative to the bending member 14 in the sliding direction 54 because the skirt attachment 16 and the bending member 14 are in sliding engagement. The bending member 14 will spring back to the first cross-sectional shape and configuration as shown in FIGS. 3-5, and there will be no damage or permanent deformation to the bending member 14 as it is designed to make this type of return. The bending member 14 thus has a first bending modulus in the FIGS. 3-5 configuration that resists bending to a certain degree, and has a second bending modulus in the FIG. 6 configuration different than the first bending modulus in which bending in this configuration is resisted to a different degree.

The bending member 14 is in sliding connection with the skirt attachment 16 so that when the bending member 14 bends from the first cross-sectional shape to the second cross-sectional shape it shortens in the vertical direction. The height of the apparatus 10 shortens when the bending member 14 changes from the first cross-sectional shape to the second cross-sectional shape. As this happens, the bending member 14 slides relative to the skirt attachment 16 and slides out of the bottom of the skirt attachment 16 as the length of the bending member 14 shortens in the vertical direction. It is therefore the case that the bending member 14 may extend below the skirt attachment 16 in the vertical direction during normal use and functioning of the apparatus 10. The trailer mounting bracket 12 is thus rigidly attached to the trailer 20 and the bending member 14 is coupled to the skirt 18 in a sliding engagement.

Figure 6:
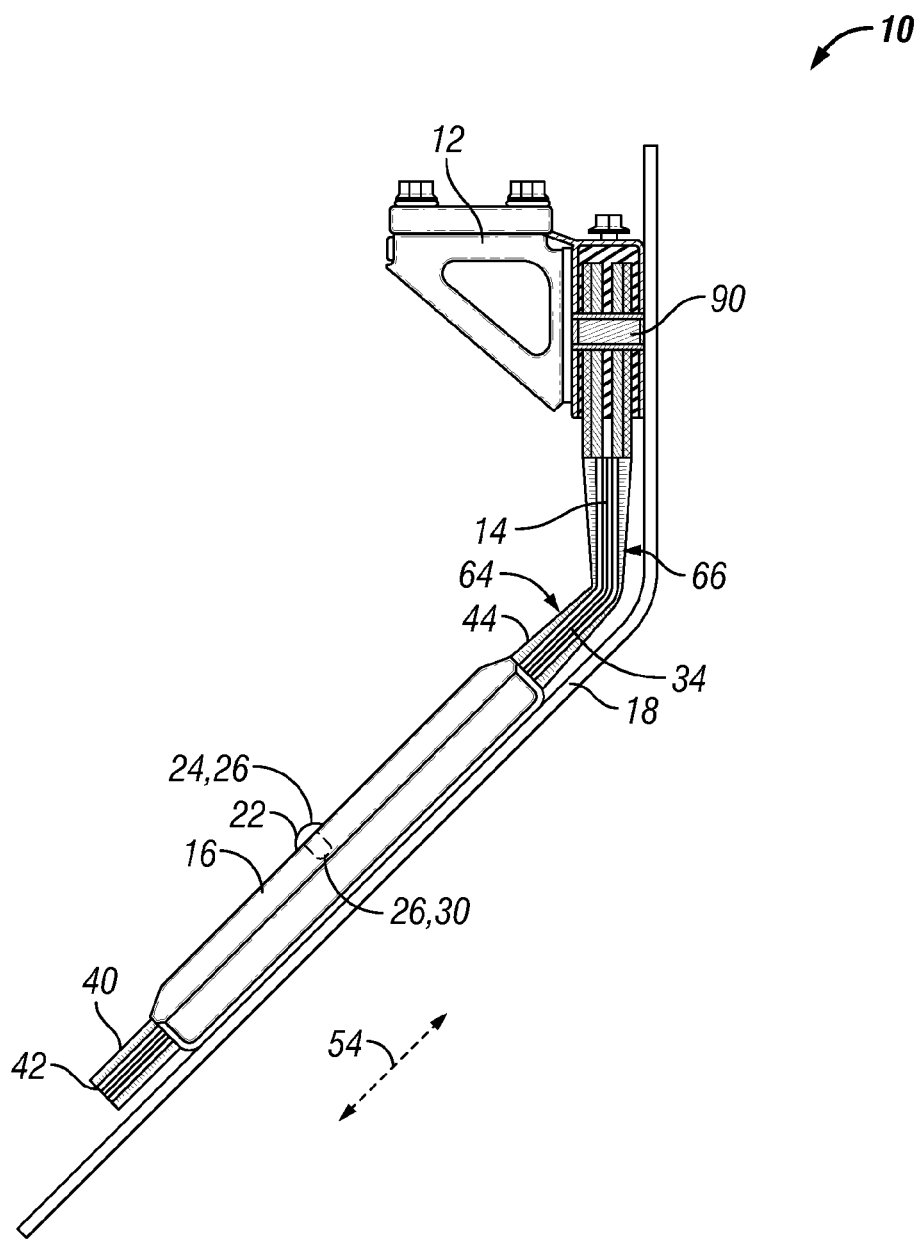
FIG. 6 is a side elevation view with the apparatus receiving a force that causes bending of the skirt and bending member and sliding of the skirt relative to the bending member.
Figure 7:
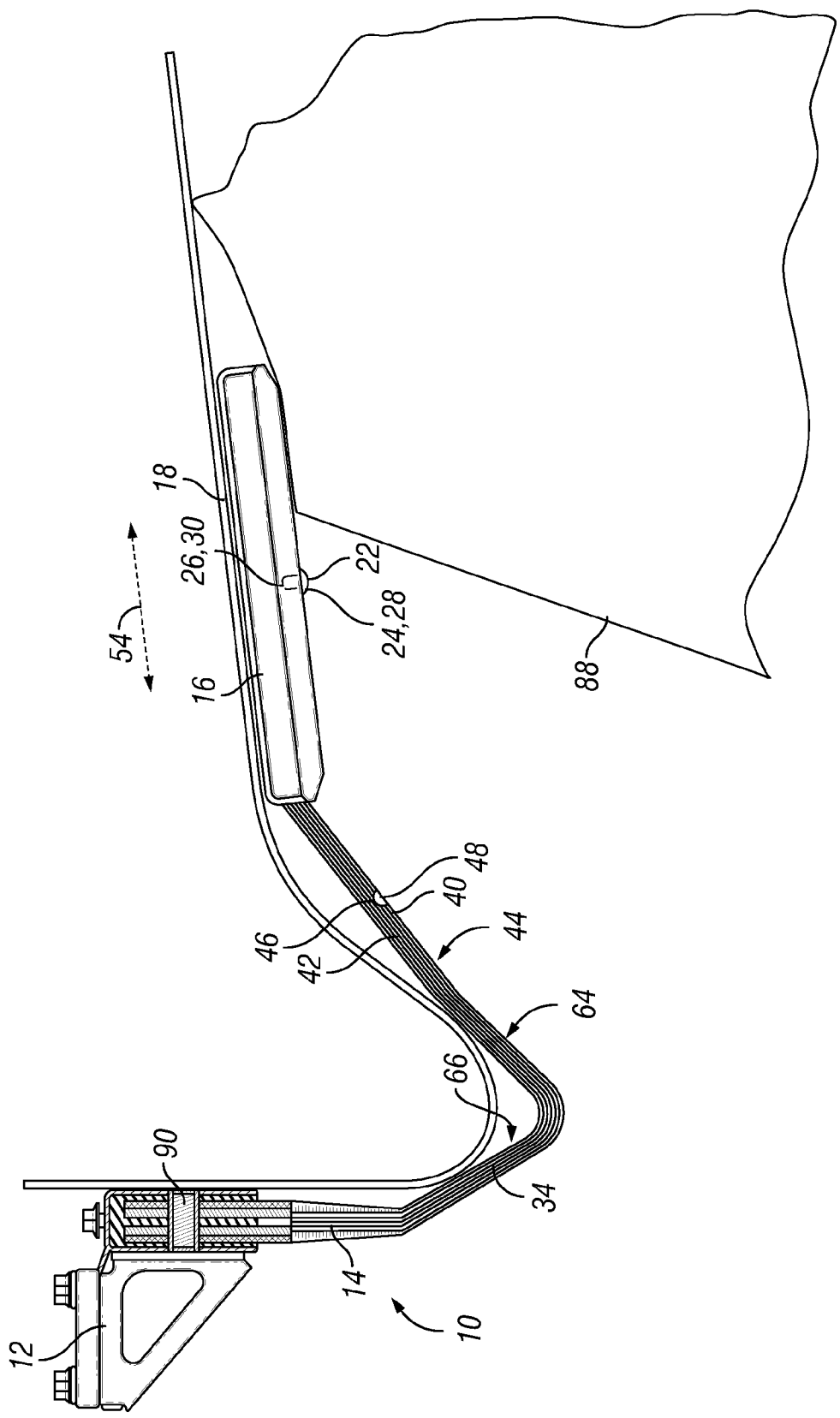
FIG. 7 is a side elevation view with the apparatus receiving a force in an opposite direction from that in FIG. 6.

In FIG. 7, the object 88 causes a force to be imparted onto the bending member 14 in a direction opposite to that of the force illustrated in FIG. 6. In this regard, the bending member 14 bends in the opposite direction from that of FIG. 6. The bending member 14 assumes a different orientation than that in FIG. 6 and can bend so as to have various bending radii along the length of the bending member 14. The skirt attachment 16 again slides relative to the bending member 14, and the bending member 14 also slides relative to the skirt 18 in the sliding direction 54. If the sliding is to a great extent, the bending member 14 may be moved relative to the skirt attachment 16 to such an extent it falls out of the skirt attachment 16. The orientation of the apparatus 10 shown in FIG. 7 is moving outboard in the lateral direction so that it moves outward from under the trailer 20.

Figure 8:
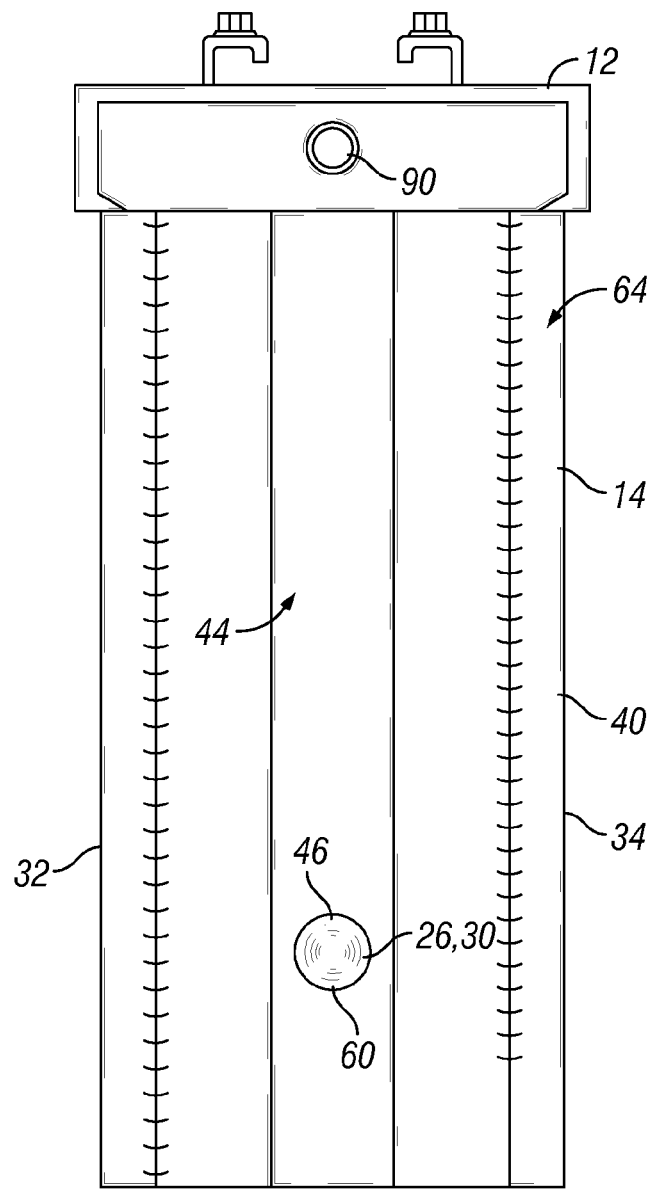
FIG. 8 is a front elevation view of the trailer mounting bracket and bending member showing a receptacle on the bending member.

FIG. 8 shows a trailer mounting bracket 12 that has V-shaped bending member 14. The bending member 14 has a left edge 32 and a right edge 34, and a face 44 that extends from the left edge 32 to the right edge 34. The face 44 has five different planer surfaces. The second member 26 is carried on the face 44 of the bending member 14. The second member 26 in this embodiment is a receptacle 30 that is a recess 46 in the face 44. The recess 46 extends into the face 44 but does not extend through the first bending element 40. Instead, the recess 46 is just a depression in the face 44 without forming a through opening so that the recess 46 is a thinner cross-section of the first bending element 40 than other portions of the first bending element 40. The recess 46 has a concave surface 60 and may have a plane at its bottom or may extend to a point so that it has a cone shape. The counterpart skirt attachment 16 has a first member 24 of the locating feature 22 that is a projection 28 that extends from the bottom surface of the skirt attachment 16. The projection 28 has a convex surface 56 and can be cone shaped or can be a truncated cone with a flat end. The shapes can likewise be reversed in that 28 can be concave or convex while feature 26 is a projection or otherwise oppositely disposed in shape so as to be complimentary.

Figure 9:
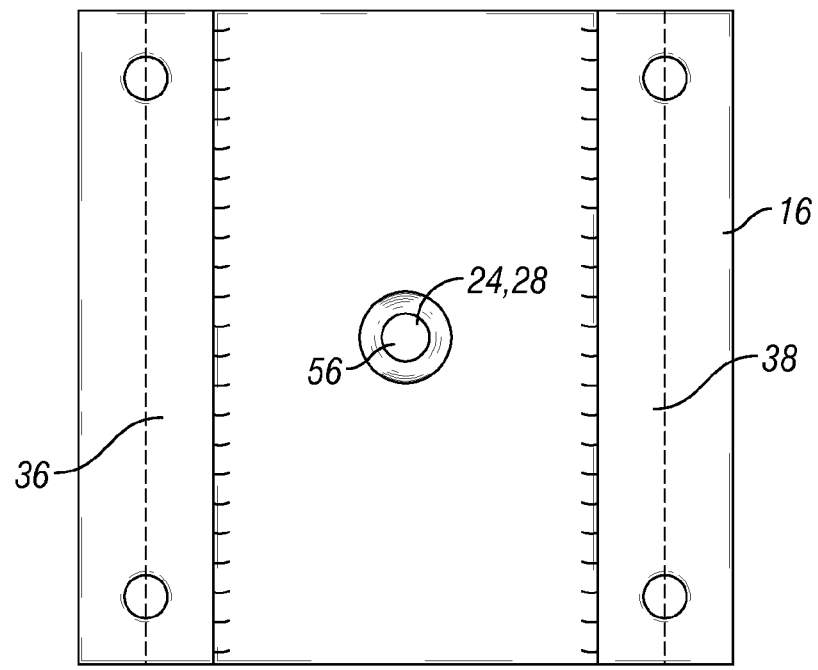
FIG. 9 is a back elevation view of a skirt attachment showing a projection.
Figure 10:
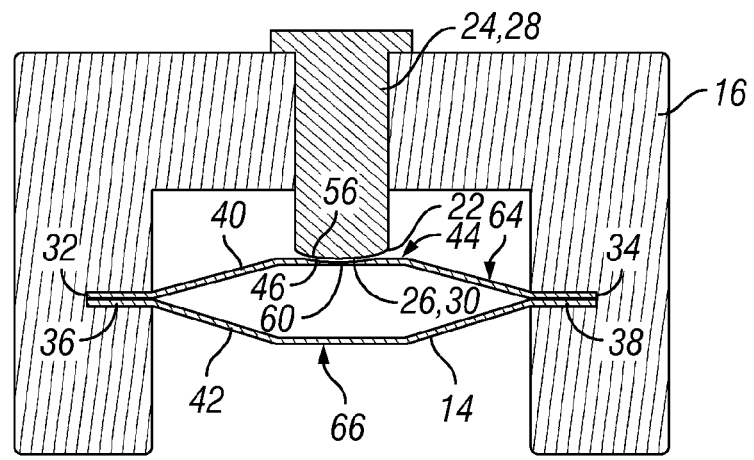
FIG. 10 is a cross-sectional view of the bending member and skirt attachment of FIGS. 8 and 9 with the projection received within the receptacle.

FIG. 10 shows the interaction of the bending member 14 and the skirt attachment 16 during the normal configuration of the skirt 18 when it is not bent or otherwise deformed via excessive force applied thereto. The bending member 14 and skirt attachment 16 from FIGS. 8 and 9 are the ones shown in FIG. 10. The bending member 14 has a pair of bending elements 40, 42 that are disposed in a V-shaped arrangement relative to one another. The top face 64 of the bending member 14 is found on the first bending element 40 and faces away from the skirt 18. The bottom face 66 of the bending member 14 is found on the second bending element 42 and faces towards the skirt 18. The two bending elements 40, 42 engage one another at the left and right edges 32, 34 of the bending member 14. The skirt attachment 16 has a left slot 36 into which the left edge 32 of the bending member 14 is disposed, and a right slot 38 into which the right edge 34 of the bending member 14 is disposed. The edges 32, 34 slide along the slots 36, 38 to allow the bending member 14 and the skirt attachment 16 to move relative to one another.

The locating feature 22 is shown in FIG. 10 and the first member 24 and the second member 26 are shown interacting with one another in this figure. The locating feature 22 has the recess 46 receiving the projection 28 such that a portion of the projection 28 is received within the recess 46. The projection 28 engages the first bending element 40 and can completely fill the recess 46, but in the FIG. 10 embodiment the projection 28 is within a part of the recess 46 but does not fill up the entire recess 46. The locating feature 22 is not present on the second bending element 42. With the projection 28 inserted into the recess 46 and engaging portions of the first bending member 40, it can be realized that movement between these two elements 28 and 40 will be limited. Although the second bending member 42 does not engage the projection 28, its movement will likewise be limited because the second bending member 42 is pinned to the first bending member 40 via the pin 90. The limitation of movement imparted by the locating feature 22 is in the sliding direction 54 of the bending member 14, and is not in a direction perpendicular to this sliding direction 54 which would be up and down in FIG. 10 and thus in the direction from the first bending element 40 to the second bending element 42.

With the projection 28 within the recess 46 the interaction prevents small movements between the bending member 14 and the skirt attachment 16 when small forces are imparted to these members so that vibration is minimized and/or eliminated, and so that wear between these parts 14, 16 by way of these constant movements is likewise minimized and/or eliminated. Further, since the recess 46 and the projection 28 are noticeable on the bending member 14 and skirt attachment 16, they can be used to properly position these two components when the apparatus 10 is assembled so that the skirt attachment 16 is properly located relative to the bending member 14, trailer mounting bracket 12, and skirt 18. The locating feature 22 prevents small relative movements between the bending member 14 and skirt attachment 16 when small forces are applied to one or both of these members, but do not interact to such an extent that it prevents all movement. In this regard, if a sufficient amount of force is applied then the projection 28 and recess 46 will be disengaged from one another allowing movement between the bending member 14 and skirt attachment 16. The disengagement will be affected by flexing of the first bending element 40 to allow the projection 28 to slide out of the recess 46. Likewise, the projection 28 could be flexible as well in other embodiments so that it can flex to allow the interaction of the projection 28 and the recess 46 to cease, to allow movement of the bending member 14 and the skirt attachment 16.

Figure 11:
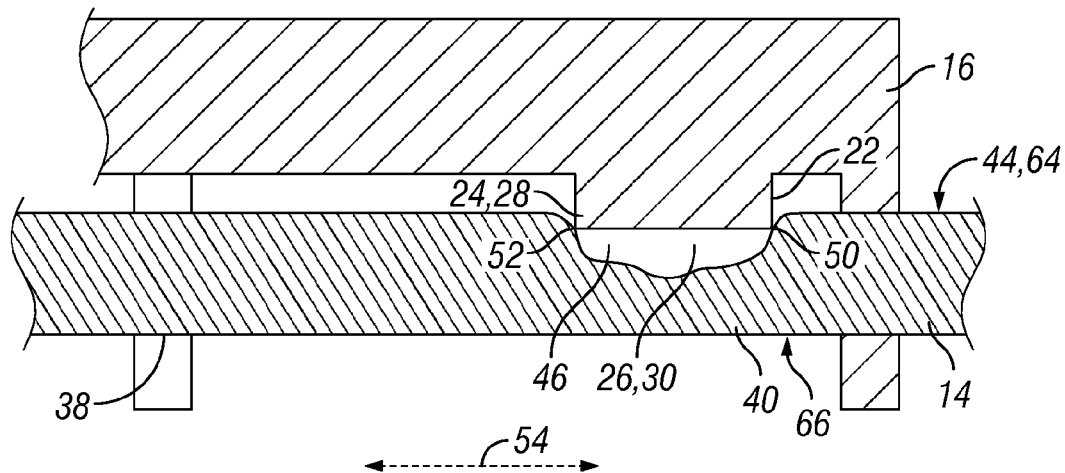
FIG. 11 is a cross-sectional view of a projection that is square shaped disposed within a receptacle that is irregular in shape.

FIG. 11 shows another embodiment of the apparatus 10 that likewise includes a first member 24 that is a projection 28, and a second member 26 that is a recess 46. The recess 46 is a depression in the face 44 of the first bending element 40, and the recess 46 is irregular in shape in this embodiment. The projection 28 has a rectangular cross-sectional shape and could be square shaped in some embodiments. The projection 28 interacts with the recess 46 by being disposed within the recess 46 and engaging the bending member 14. The projection 28 has a leading end 50 and a trailing end 52 that both engage the bending member 14. Should the projection 28 be on the bending member 14, the leading end 50 and trailing end 52 would engage the skirt attachment 16 when within the recess 46 in the skirt attachment 16 in this embodiment. The leading end 50 and trailing end 52 are arranged relative to one another in a sliding direction 54 of the bending member 14. The engagement of both the leading end 50 and the trailing end 52 prevent movement of the projection 28 relative to the bending member 14 in the sliding direction 54. The projection 28 and recess 46 are designed so that an empty space still exists within the recess 46 when the projection 28 interacts with the recess 46 to prevent relative movement between the bending member 14 and skirt attachment 16 upon the application of small forces. It can be appreciated that if the projection 28 were placed within the recess 46 and the leading end 50 engages the first bending element 40 and the trailing end 52 does not engage the first bending element 40 then the bending member 14 will be able to move relative to the skirt attachment 16 in the sliding direction 54. As such, contact by at least two of the ends 50, 52 disposed forward and rearward in the sliding direction 54 prevents the aforementioned relative movement in the sliding direction 54. The recess 46 is thus irregular in shape, and it is to be understood that the first and second members 24, 26 could be of various shapes both uniform and non-uniform in appearance.

Figure 12:
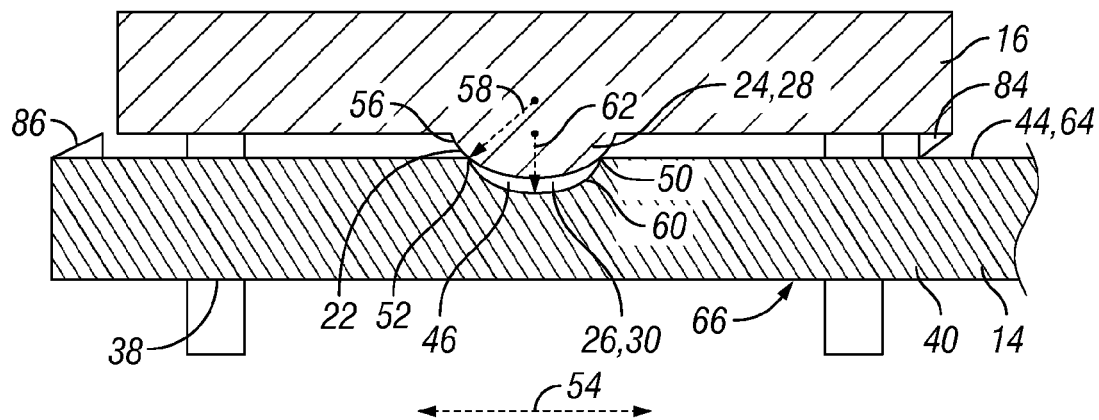
FIG. 12 is a cross-sectional view of a projection that has a larger radius disposed within a receptacle that has a radius smaller than that of the projection.
Figure 13:
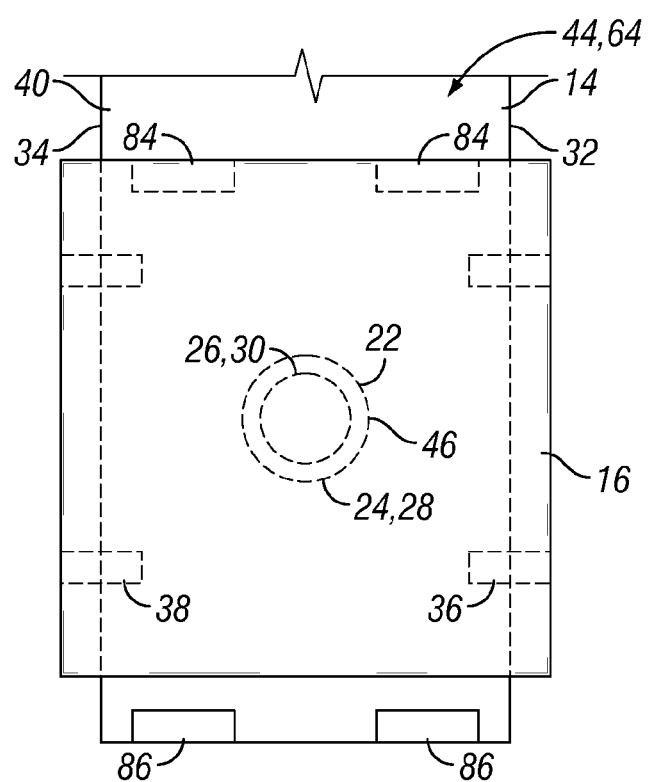
FIG. 13 is a top plan view of the skirt attachment and bending member of FIG. 12.

The sizes and shapes of the first and second members 24, 26 could be provided in a variety of manners. FIGS. 12 and 13 show another exemplary embodiment in which the first member 24 is a projection 28 and has a convex surface 56 at its end. The convex surface 56 is defined by a convex radius 58. The bending member 14 carries the second member 26 that is a receptacle 30 being a recess 46 that extends into the first bending member 40 but does extend through the first bending member 40. The recess 46 has a concave surface 60 that is defined by a concave radius 62. The concave radius 62 is smaller than the convex radius 58. With this arrangement, the convex surface 56 does not completely fit inside of the concave radius 62 so that the projection 28 does not completely nest within the recess 46. With the surfaces 56, 60 interacting, an empty space is present within the recess 46, and the leading and trailing ends 50, 52 of the projection 28 engage the first bending element 40 to prevent relative movement between the bending member 14 and the skirt attachment 16 in the sliding direction 54. Although shown as having different radii, the convex radius 58 could be the same as the concave radius 62 in other embodiments. It is to be understood that as used herein, the term radius may also refer to the radius of curvature.

The embodiment in FIGS. 12 and 13 includes a first stop member 84 on one end of the skirt attachment 16, and a second stop member 86 on one end of the bending member 14. The stop members 84, 86 are provided to prevent the bending member 14 from becoming removed from the skirt attachment 16. Upon bending by the skirt 18, the bending member 14 will also be bent and in so doing will move relative to the skirt attachment 16 in the sliding direction 54. If the bending and sliding is excessive, the bending member 14 will become completely removed out of the skirt attachment 16. Once the force is removed, the bending member 14 may push the skirt 18 back into its original position, but the bending member 14 may not automatically reinsert back into the skirt attachment 16. The stop members 84, 86 are rigidly attached to the skirt attachment 16 and bending member 14. As the bending member 14 moves in the sliding direction 54 relative to the skirt attachment 16, the two stop members 84, 86 will approach one another until the bending member 14 is almost removed from the skirt attachment 16. At this point, the stop members 84, 86 will engage one another and relative movement in the sliding direction 54 will be prevented so that the bending member 14 will not be disengaged from the skirt attachment 16. The bending member 14 will be rigidly attached to the skirt attachment 16 such that both of these components lock together during the excessive deflection of the skirt 18. Once the force is removed from the skirt 18, the bending member 14 is allowed to move in the opposite direction in the sliding direction 54 relative to the skirt attachment 16 because the stop members 84, 86 do not impede motion in this direction. The stop members 84, 86 will become disengaged and the bending member 14 can move back into the position illustrated in FIG. 12 relative to the skirt attachment 16. The stop members 84, 86 do not prevent or impede relative motion in the opposite direction such that if the skirt attachment 16 slides toward the trailer mounting bracket 12 in the sliding direction 54 the stop members 84, 86 will not function to lock or stop relative motion in this direction. With particular reference to FIG. 13, the stop members 84, 86 are not a single element but are separate elements spaced form one another in the width direction so that the projection 28 and recess 46 are on either side of these two pieces. This arrangement provides clearance for the stop members 84, 86. In other embodiments, the second stop member 86 could be set up to engage the projection 28 to lock the bending member 14 onto the skirt attachment 16. In yet other arrangements, the first and second stop members 84, 86 are a single element instead of being separated as illustrated.

Figure 14:
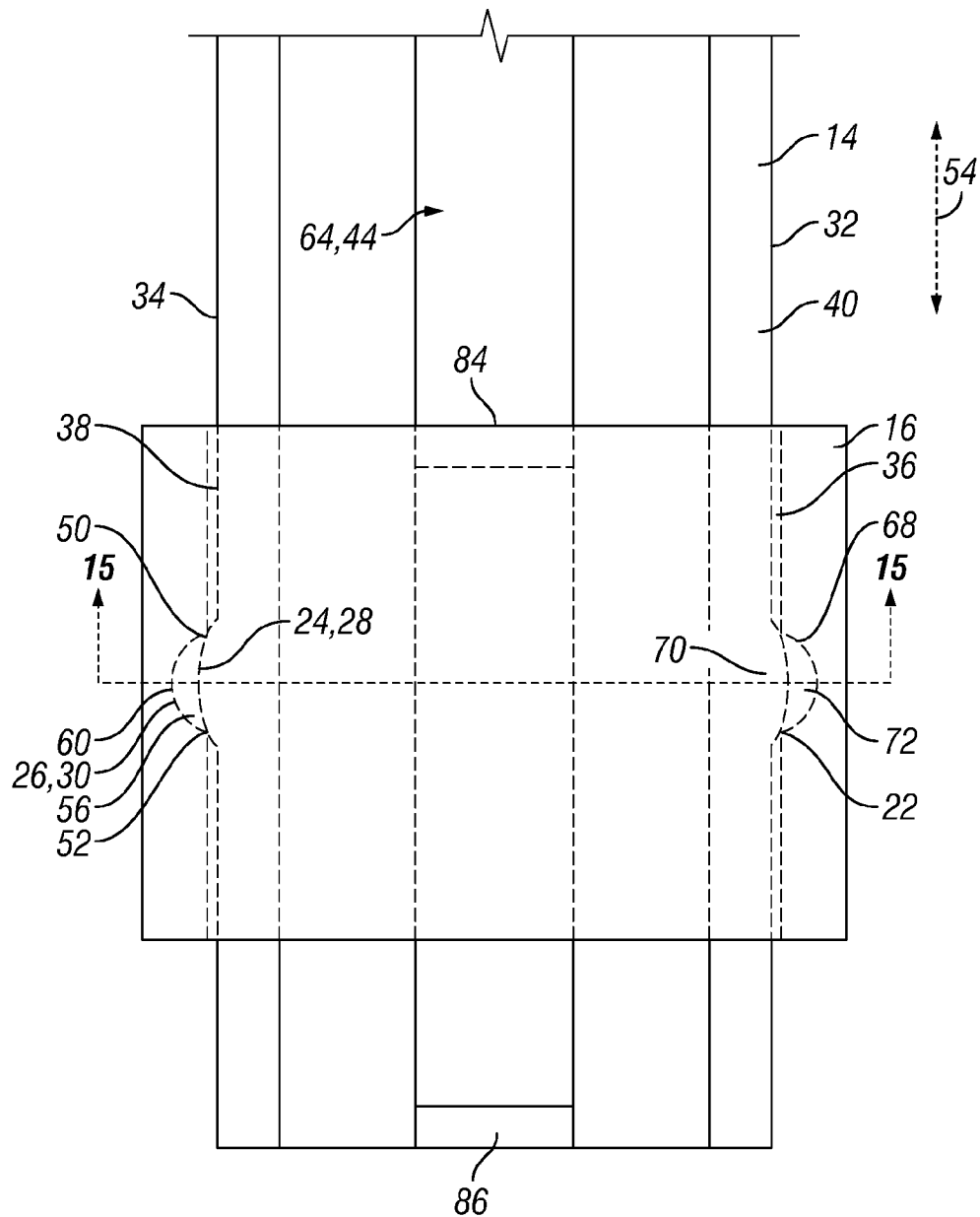
FIG. 14 is a top plan view of a skirt attachment and bending member in which the locating feature is at the edges and slots of the bending member and skirt attachment.
Figure 15:
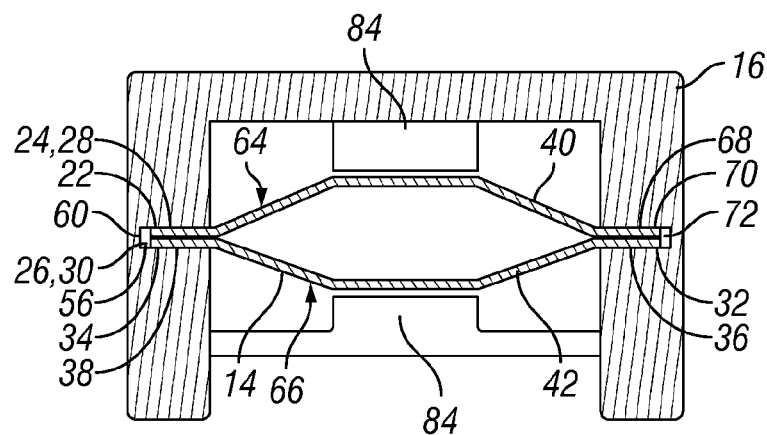
FIG. 15 is a cross-sectional view taken along line 15-15 of FIG. 14.

Another embodiment of the apparatus 10 is shown in FIGS. 14 and 15 in which the locating feature 22 is located on the edges of the bending member 14 and slots of the skirt attachment 16, instead of on the face 44 and inside portion of the skirt attachment 16. The locating feature 22 includes a first member 24 that is a projection 28 that is located on a right edge 34 of the bending member 14. There are two bending elements 40, 42 that make up the bending member 14, and the projection 28 is located on both of the bending elements 40, 42. The edge 34 of the bending member 14 is located within a right slot 38 of the skirt attachment 16 such that both bending elements 40, 42 are also within the right slot 38. The edge 34 can slide within the right slot 38 which may be aligned in the sliding direction 54. The projection 28 extends laterally outward from the linear portion of the right edge 34. The skirt attachment 16 includes the second member 26 that is a receptacle 30 that has a concave surface 60. The projection 28 has a convex surface 56 that is disposed within some, but not all of, the receptacle 30. The projection 28 engages the skirt attachment 16 at the leading end 50 and the trailing end 52 and retains the position of the skirt attachment 16 and bending member 14 until the application of a sufficient amount of force to prevent movement in the sliding direction 54.

The left edge 32 and left slot 36 include a second locating feature 68 with a second projection 70 on the left edge 32, and a second receptacle 72 of the left slot 36 that receives the second projection 70. The second receptacle 72 and second projection 70 can be arranged in the same manners as the locating feature 22 on the right edge 34 and right slot 38, and a repeat of this information is not necessary. Although shown as having a first locating feature 22 and a second locating feature 68, it is to be understood that in other embodiments only a single locating feature 22 may be present and two of them 22 and 68 are not present. The embodiment shown in FIGS. 14 and 15 also include first and second stop members 84, 86 to limit movement of the bending member 14 relative to the skirt attachment 16 in one direction of the sliding direction 54 so that they do not become disengaged in this particular direction of the sliding direction 54.

Figure 16:
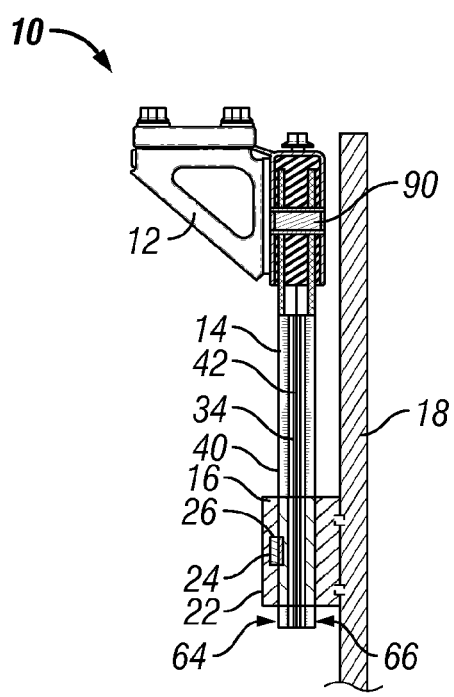
FIG. 16 is a cross-sectional view of the apparatus with the locating feature being high frictional members.
Figure 17:
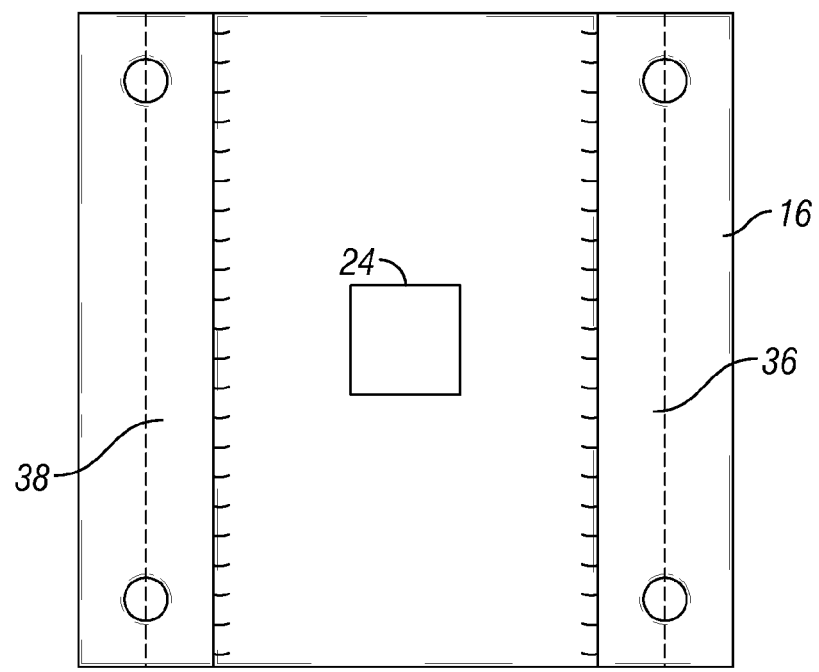
FIG. 17 is a back elevation view of the skirt apparatus of FIG. 16.

FIGS. 16 and 17 illustrate another embodiment of the apparatus 10 in which the first and second member 26 again interact with one another to limit sliding movement of the skirt 18 and skirt attachment 16 relative to the bending member 14. The first member 24 is a high frictional member located on the skirt attachment 16, and the second member 26 is a high frictional member located on the face 44 of the first bending element 40 of the bending member 14. The high frictional members 24, 26 can be sections that have higher friction than other portions of the bending member 14 and skirt attachment 16. For example, the members 24, 26 can be rubber sections, while the surrounding portions of the bending member 14 and skirt attachment 16 are aluminum, steel, or plastic. Instead of being made of different materials with higher frictional properties, the first and/or second bending members 24, 26 may be made of the same materials but may be rougher sections of the skirt attachment 16 and/or bending member 14 to achieve the higher frictional properties. When the two higher frictional members 24, 26 are in engagement with one another, the higher frictional coefficient achieved between their engagement prevents small movement in the sliding direction 54 so that premature wear of these portions is minimized and so that a locating feature is present to the installer during assembly.

Figure 18:
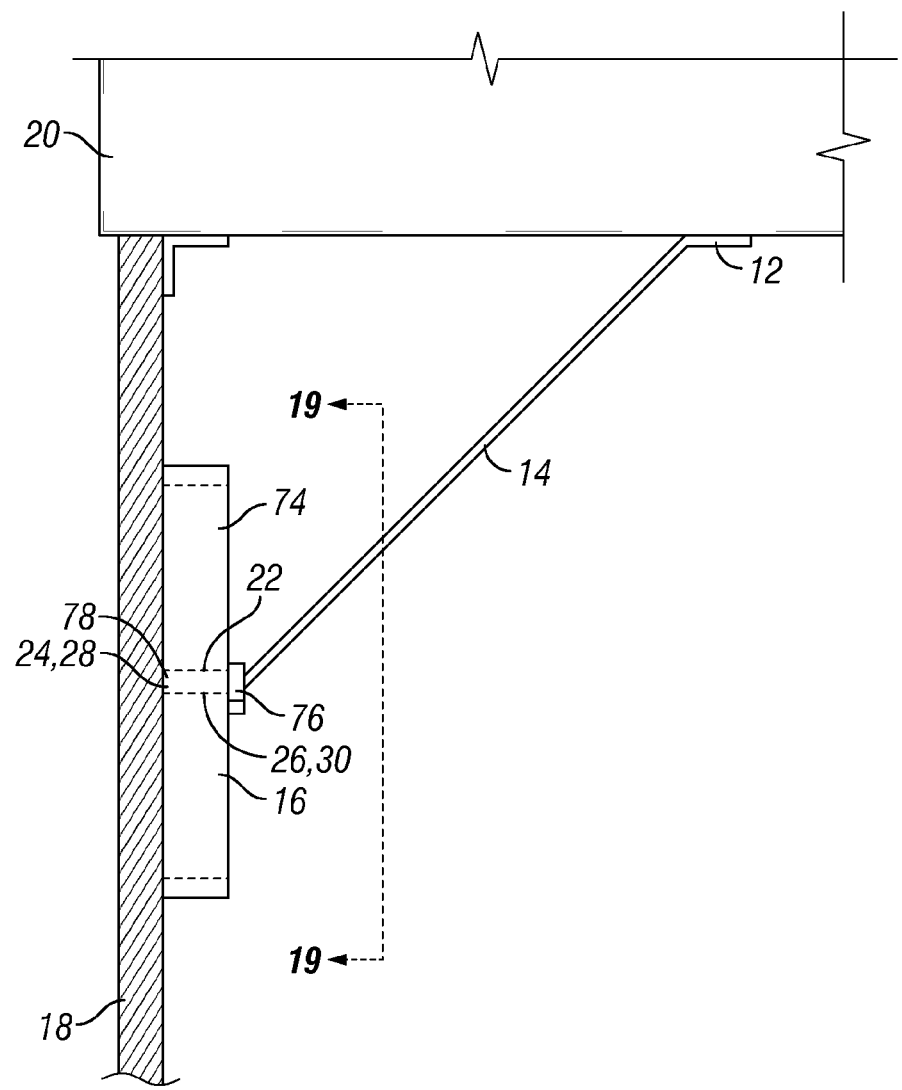
FIG. 18 is a side elevation view of the apparatus with a projection attached to the skirt and the skirt attachment rigidly attached to the bending member.
Figure 19:
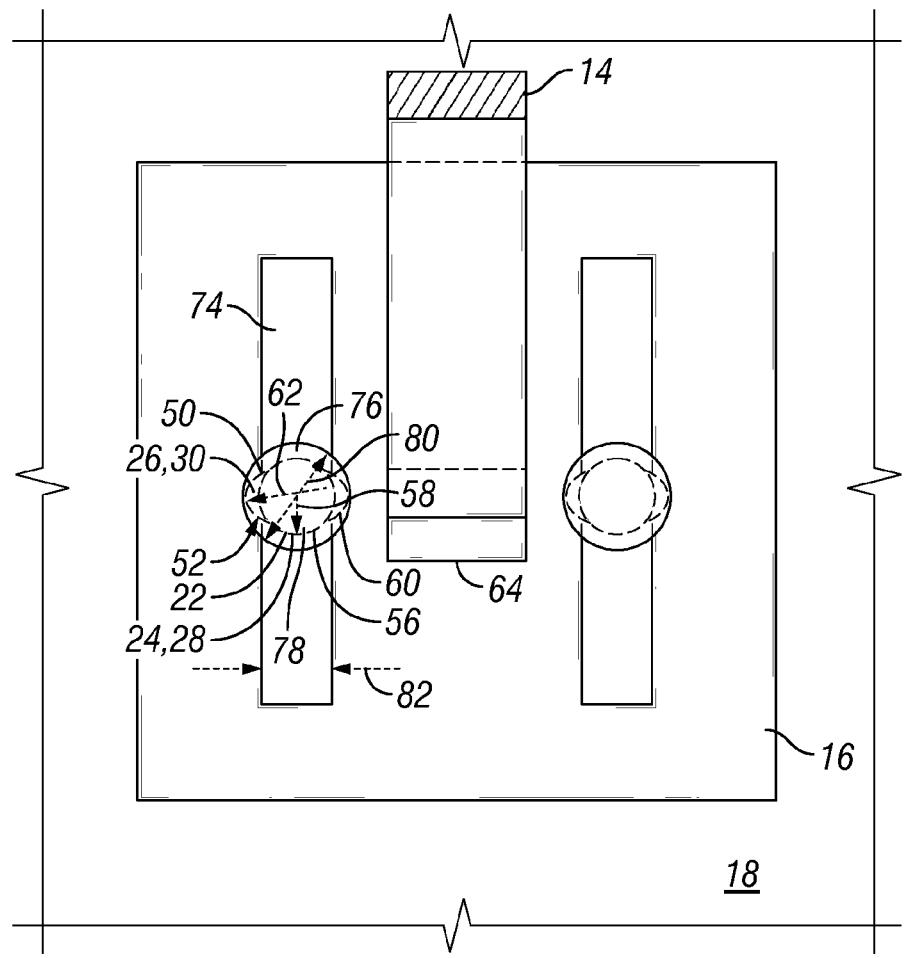
FIG. 19 is a cross-sectional view taken along line 19-19 of FIG. 18.

Although described as having the skirt attachment 16 sliding/moving relative to the bending member 14, it is to be understood that the apparatus 10 includes various embodiments where these two components do not move and/or slide relative to one another but instead remain stationary relative to one another. In all embodiments, the bending member 14 will move relative to the skirt 18. This movement may be a sliding movement but need not be in every instance. One embodiment in which the bending member 14 does not slide relative to the skirt attachment is shown with reference to FIGS. 18-21. The trailer mounting bracket 12 is rigidly attached to the trailer 20 via bolts or clamps, and the bending member 14 is integrally formed with the trailer mounting bracket 12 instead of being a separate piece that is attached through a mechanical connection. The bending member 14 can be a single member and may deform when the skirt 18 has a force imparted thereon and may spring back into the position shown in FIGS. 18 and 19 once the force is removed. Instead of being vertical in orientation, the bending member 14 is angled relative to the ground. The skirt attachment 16 is attached via welding, bolts, integral formation, or any mechanical connection to an end of the bending member 14. The skirt attachment 16 does not slide relative to the bending member 14. Instead, the skirt 18 features the first member 24 that is a projection 28 that extends from the inside of the skirt 18 and into the skirt attachment 16. The skirt attachment 16 can engage the skirt 18 but is not rigidly attached to the skirt 18 like in previously described embodiments. Instead, the skirt 18 may slide relative to the skirt attachment 16 and bending member 14 during deflection of the skirt 18.

The projection 28 is disposed with a slot 74 of the skirt attachment 16. The slot 74 opens up into the second member 26 which is a receptacle 30 that is wider than the slot 74. The receptacle 30 has a pair of concave surfaces 60 on either side of the slot 74. The projection 28 features a body 78 that extends from the skirt 18 to a head 76 that is located on the end of the projection 28. The body 78 has a convex surface 56 with a convex radius 58 smaller than a concave radius 60 of the receptacle 30. A portion of the convex surface 56 of the body 78 extends into both of the receptacles 30, forming engagement points at the leading and trailing ends 50, 52. The projection 28 is thus held steady within the receptacle 30 during movement of the trailer 20 so that the skirt 18 does not flutter and so that the connection does not move during normal movement of the trailer 20.

Figure 20:
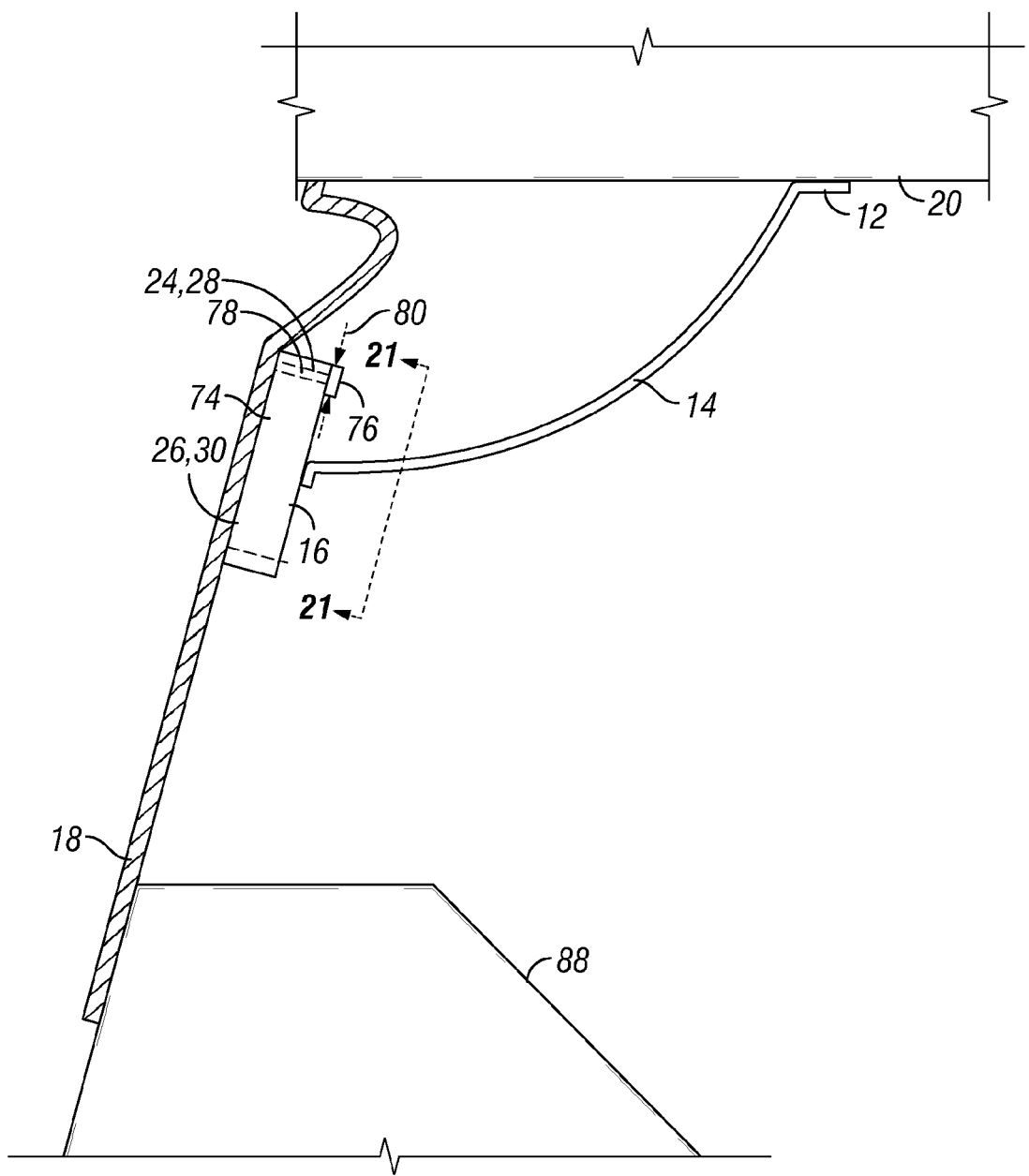
FIG. 20 is a side elevation view of the apparatus of FIG. 18 with a force applied to the skirt to deflect the skirt laterally outward.
Figure 21:
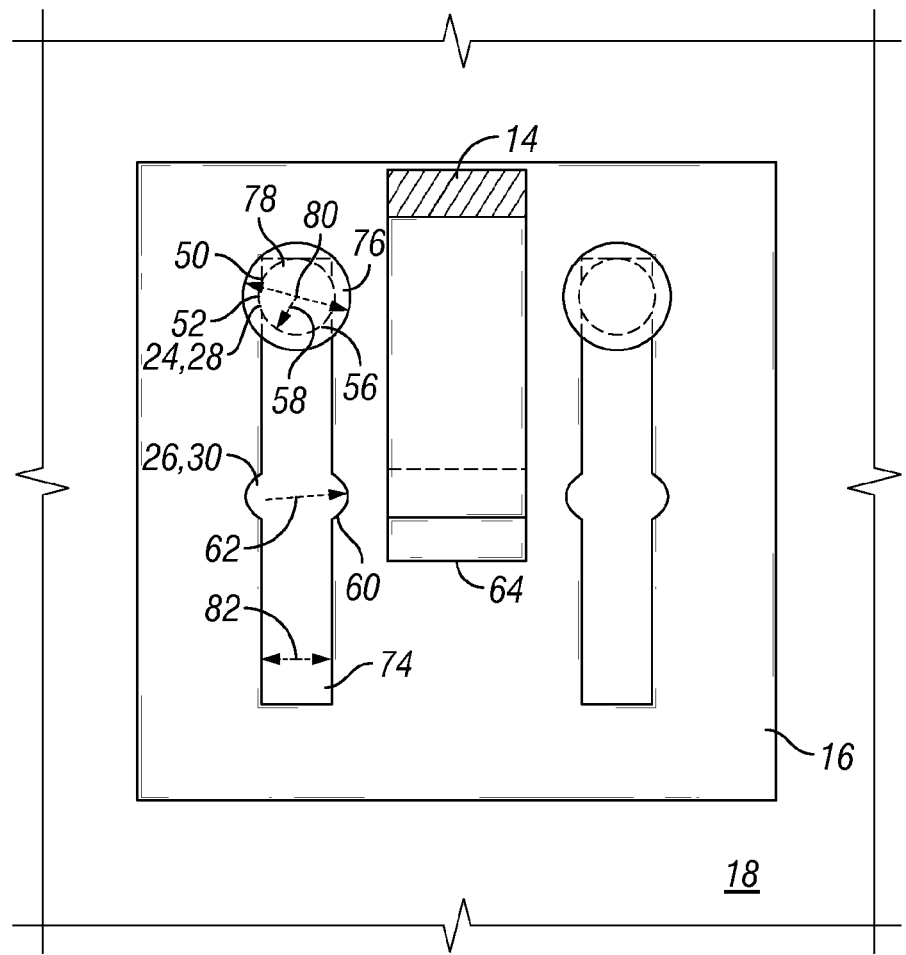
FIG. 21 is a cross-sectional view taken along line 21-21 of FIG. 20.

When the skirt 18 engages an object 88 sufficient to deflect the skirt 18, the force is sufficient to push the body 78 from the receptacle 30 and along the slot 74 so that the projection 28 and skirt 18 slide relative to the bending member 14 and the skirt attachment 16. FIGS. 20 and 21 show this sliding from the at rest position in FIGS. 18 and 19. The body 78 may slide along the slot 74 via an interference fit of the body 78 within the slot 74. There can be some amount of flexing or deformation to allow the body 78 to slide within the slot 74. The head 76 holds the skirt attachment 16 to the skirt 18 because the head 76 has a diameter 80 that is greater than a width 82 of the slot 74. In this manner, the skirt attachment 16 is locked onto the skirt 18 although it is capable of sliding relative to the skirt 18. The attachment of the bending member 14 at the skirt attachment 16 does not change upon the sliding of the projection 28 within the slot 74. Release of the force from the object 88 causes the apparatus 10 to spring back into the position shown in FIGS. 18 and 19. The locating feature 22 provides the design with a two stage spring rate in which a first force is needed to remove interaction of the members 24, 26, and a second force is needed to bend the single stage bending member 14. The bending member 14 may thus be a strut, as opposed to a bi-modulus cantilevered beam as shown in other embodiments. As shown, the illustrated embodiment has a second locating feature 22 with a second corresponding slot located on the other side of the attachment of the bending member 14 at the skirt attachment 16. This second locating feature 22 can function in the same manner as discussed with respect to the first locating feature 22. Further, in yet other arrangements only a single locating feature 22 is present and the second slot and locating feature are not necessary.

The locating feature 22 may take on various forms from those illustrated, and it is to be understood that other designs are possible from those discussed. Another such design can be seen with reference back to the embodiment shown in FIG. 5. Here, the second member 26 is carried by the bending member 14 which is made up of four of the bending elements. Two of the bending elements 40, 42 include the second member 26, and the other two of the bending elements do not carry or include the second member 26. The second member 26 is an aperture 48 that extends completely through the first bending element 40, and a recess 46 that goes into the second bending element 42 but not all the way through the second bending element 42. The first member 24 is a projection 28 that goes completely through the aperture 48 and into the recess 46 and maintains the position of the bending member 14 relative to the skirt attachment 16 during use. When sufficient force is applied, the projection 28 is popped out of the recess 46 and aperture 48 and the bending member 14 may slide relative to the skirt attachment 16. When the bending member 14 is a bifurcated beam, the locating feature 22 provides it with a three stage spring rate in which an initial force is needed to remove interaction of the members 24, 26, a second force is needed to bend the bending member 14 until it buckles, and a third force is needed to bend the bending member 14 after buckling.

The apparatus 10 thus prevents or minimizes movement of the skirt 18 relative to the bending member 14 during normal use of the trailer 20 so that movements when small forces to the skirt 18, bending member 14, and skirt attachment 16 are applied. When significant bending forces through hitting the object 88 are realized, the locating feature 22 is overcome to allow movement as designed. The deformation is a plastic deformation that slightly deforms the components but allows them to recover for repeated holding once the force from the object 88 is removed and the skirt 18 bounces back to its initial at rest position. The locating feature 22 likewise provides a landmark in assembling the skirt attachment 16, bending member 14 and other portions relative to the skirt 18 and trailer 20. If the members 24, 26 interact with one another, they may be held together to thus hold the bending member 14 to the skirt attachment 16 to make assembly easier.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

I claim:

1. An apparatus, comprising:
   a trailer mounting bracket;
   a bending member carried by the trailer mounting bracket;
   a skirt attachment configured for engaging a skirt of a tractor trailer, wherein the bending member is received by the skirt attachment such that the bending member is configured to slide relative to the skirt; and
   a locating feature that has a first member and a second member, wherein one of the first member and the second member is carried by the skirt attachment, and wherein the first member and the second member interact with one another to stabilize the position of the bending member relative to the skirt until a sufficient amount of force is applied to move the first member and the second member relative to one another to allow the bending member to slide relative to the skirt.

2. The apparatus as set forth in claim 1, wherein the first member is a projection and the second member is a receptacle, and the projection and the receptacle interact with one another by having the projection received within the receptacle.

3. The apparatus as set forth in claim 2, wherein the bending member has a plurality of bending elements, and wherein a left edge and a right edge of the bending member are received within left and right slots of the skirt attachment when the projection is received within the receptacle, wherein the projection is located on the skirt attachment, and wherein the receptacle is located in a face of one of the bending elements and is not located in all of the bending elements, and wherein the bending member slides relative to the skirt attachment.

4. The apparatus as set forth in claim 3, wherein the receptacle is located on only one of the bending elements and none of the other of the plurality of bending elements, wherein the receptacle is a recess in the face of the bending element and does not extend all the way through the bending element.

5. The apparatus as set forth in claim 3, wherein the receptacle is an aperture that extends completely through a first one of the plurality of bending elements and is a recess in a second one of the plurality of bending elements that does not extend completely through the second one of the plurality of bending elements, wherein the projection is received in both the aperture and the recess when the projection and the receptacle interact with one another.

6. The apparatus as set forth in claim 2, wherein the projection has a leading end and a trailing end that are oriented forward and rearward relative to one another in a sliding direction of the bending member, wherein both the leading end and the trailing end engage the bending member or the skirt attachment when the projection is received within the receptacle.

7. The apparatus as set forth in claim 2, wherein the projection has a convex surface that has a convex radius, wherein the receptacle has a concave surface that has a concave radius, wherein the convex radius is greater than the concave radius.

8. The apparatus as set forth in claim 2, wherein the bending member has a top face and a bottom face such that the bottom face is configured for facing the skirt and the top face is configured for facing away from the skirt, wherein the bending member has a left edge and a right edge, wherein the skirt attachment has a left slot and a right slot and the left and right edges are disposed within the left and right slots when the projection and the receptacle interact with one another;
   wherein the projection and the receptacle are located at either the left edge and left slot, or are located at the right edge and right slot.

9. The apparatus as set forth in claim 8, wherein the bending member has a first and a second bending element, wherein the projection is located on the left edge of the bending member on both the first and second bending elements, wherein the receptacle is located at the left slot; and further comprising:
   a second locating feature that has a second projection that is located on the right edge of the bending member on both the first and second bending elements, wherein the second locating feature has a second receptacle that is located at the right slot, wherein the second projection is disposed within the second receptacle when the projection is received within the receptacle.

10. The apparatus as set forth in claim 2, wherein the projection is located on the skirt and is rigidly attached to the skirt, and wherein the skirt attachment has a slot, wherein the receptacle is located on the skirt attachment and opens up into the slot, and
    wherein when the bending member slides relative to the skirt the projection is located in the slot and outside of the receptacle.

11. The apparatus as set forth in claim 10, wherein the projection has a head that has a diameter greater than a width of the slot such that the head retains the skirt attachment to the skirt, and wherein the projection has a body that engages the skirt attachment via an interference fit when the projection is located in the slot.

12. The apparatus as set forth in claim 1, wherein the skirt attachment is configured for being rigidly attached to the skirt, and wherein the bending member slides relative to the skirt attachment, wherein the first member is on the skirt attachment and the second member is on the bending member, wherein the first member has a higher friction than portions of the skirt attachment, wherein the second member has a higher friction than portions of the bending member.

13. The apparatus as set forth in claim 12, wherein the first member has a higher friction than portions of the skirt attachment because the first member is made of a different material than the portions of the skirt attachment, and wherein the second member has a higher friction than portions of the bending member because the second member is made of a different material than portions of the bending member.

14. The apparatus as set forth in claim 1, further comprising:
    a first stop member carried by the skirt attachment; and
    a second stop member carried by the bending member, wherein when the bending member slides relative to the skirt the first stop member and the second stop member engage each other to prevent the bending member from being removed from the skirt attachment.

15. The apparatus as set forth in claim 1, wherein the trailer mounting bracket and the bending member are integrally formed with one another.

16. The apparatus as set forth in claim 1, wherein the skirt is carried by a trailer of the tractor trailer and is at the bottom of the trailer.

* * * * *